US010670708B2

(12) United States Patent
Kemmer et al.

(10) Patent No.: US 10,670,708 B2
(45) Date of Patent: Jun. 2, 2020

(54) SENSOR FUSION-BASED SWATH PROFILE

(71) Applicant: AGCO Corporation, Duluth, GA (US)

(72) Inventors: Klaus-Peter Kemmer, Hesston, KS (US); Jacob van Bergeijk, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 335 days.

(21) Appl. No.: 15/856,833

(22) Filed: Dec. 28, 2017

(65) Prior Publication Data

US 2018/0188366 A1 Jul. 5, 2018

Related U.S. Application Data

(60) Provisional application No. 62/440,423, filed on Dec. 30, 2016.

(51) Int. Cl.
*G01S 13/86* (2006.01)
*A01D 41/127* (2006.01)
*A01F 15/08* (2006.01)
*G01S 17/86* (2020.01)
*G01S 17/931* (2020.01)
*A01B 69/04* (2006.01)
*A01D 89/00* (2006.01)
(Continued)

(52) U.S. Cl.
CPC .......... *G01S 13/865* (2013.01); *A01B 69/008* (2013.01); *A01D 41/1271* (2013.01); *A01D 41/1278* (2013.01); *A01D 89/00* (2013.01); *A01F 15/0825* (2013.01); *G01S 13/931* (2013.01); *G01S 17/86* (2020.01); *G01S 17/931* (2020.01); *G01S 19/14* (2013.01); *G01S 2013/9318* (2020.01); *G01S 2013/9323* (2020.01)

(58) Field of Classification Search
CPC .... G01S 13/867; G01S 13/865; G01S 13/931; G01S 17/86; G01S 17/931; A01B 69/008; A01D 41/127; A01D 41/1271; A01D 41/1274; A01D 41/1278; A01D 89/00; A01F 15/0825
See application file for complete search history.

(56) References Cited

U.S. PATENT DOCUMENTS 9,288,938 B2 * 3/2016 Cavender-Bares ............ A01C 21/002
2009/0258684 A1 * 10/2009 Missotten ............... G01N 21/85
460/5
(Continued)

OTHER PUBLICATIONS

European Patent Office, International Search Report for related EP Application No. 17203091.8, dated May 4, 2018.

*Primary Examiner* — Peter M Bythrow

(57) ABSTRACT

In one embodiment, a system comprising a machine configured to traverse a field having windrows; a radar sensor mounted to the machine, the radar sensor arranged to transmit first signals to, and receive first reflected signals from, one of the windrows and the field adjacent the one of the windrows; a lidar sensor mounted to the machine, the lidar sensor arranged to transmit second signals to, and receive second reflected signals from, the one of the windrows and the field adjacent the one of the windrows; and a processing circuit configured to receive data corresponding to the first and second reflected signals and determine a mass profile and a geometric profile of the one of the windrows based on the data.

20 Claims, 5 Drawing Sheets

(51) Int. Cl.
*G01S 13/931* (2020.01)
*G01S 19/14* (2010.01)

(56) References Cited

U.S. PATENT DOCUMENTS

| | | | | |
|---|---|---|---|---|
| 2014/0165528 | A1* | 6/2014 | Olander | A01F 15/085 56/341 |
| 2014/0338298 | A1* | 11/2014 | Jung | A01D 41/127 56/10.2 R |
| 2015/0262351 | A1* | 9/2015 | Dima | G06T 7/0004 382/110 |
| 2015/0321694 | A1* | 11/2015 | Nelson, Jr. | G06T 7/73 382/104 |
| 2016/0000008 | A1* | 1/2016 | Scholer | G01F 1/662 56/10.2 R |
| 2016/0073583 | A1* | 3/2016 | Reich | G01S 17/89 702/41 |
| 2016/0078611 | A1* | 3/2016 | Butts | G01S 17/89 382/110 |
| 2016/0157414 | A1* | 6/2016 | Ackerman | A01B 69/008 701/25 |
| 2017/0089742 | A1* | 3/2017 | Bruns | A01D 41/1273 |
| 2017/0223889 | A1* | 8/2017 | Cavender-Bares | A01B 69/008 |
| 2017/0307746 | A1* | 10/2017 | Rohani | G01S 13/42 |

* cited by examiner

SENSOR FUSION-BASED SWATH PROFILE

TECHNICAL FIELD

The present disclosure is generally related to agriculture technology, and, more particularly, precision farming.

BACKGROUND

The selection of an optimal drive path to pick up windrows may depend on the machine that is used to pick up the windrow. For instance, a combine harvester equipped with a pickup header may be guided to follow a windrow such that the observable center of the windrow is aligned with the center of the header. A baler, on the other hand, may be guided to follow a windrow in a way that enables the material compaction pressure to be distributed equally across the width of the bale. A typical method to achieve the equal distribution is to follow a somewhat zig-zag pattern along the windrow direction. Improvements in the way of picking up windrow are desired.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1A:
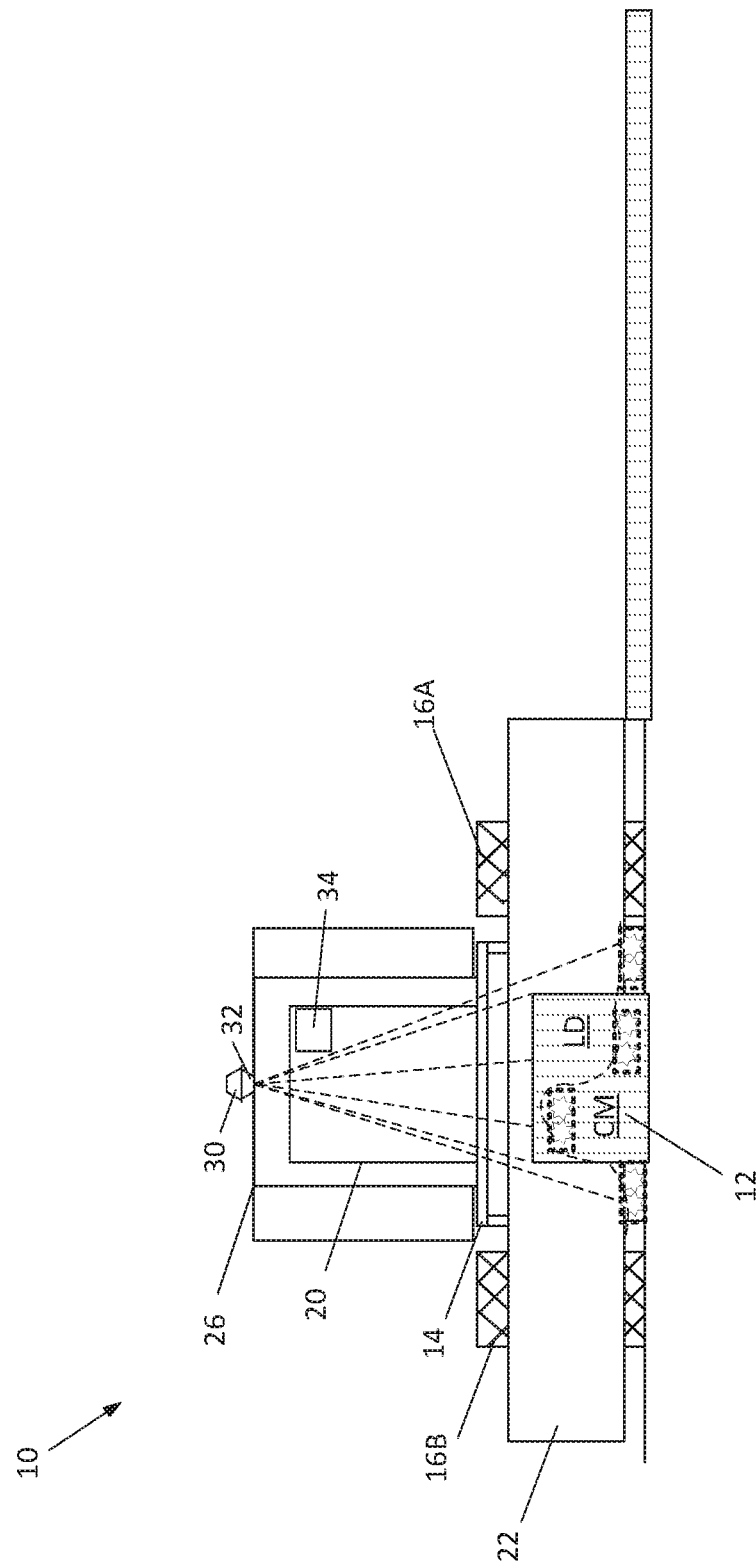
FIG. 1A is a schematic diagram that illustrates, in front elevation view, an example agricultural machine in which an embodiment of a swath profile system may be implemented.

In one embodiment, a system comprising a machine configured to traverse a field having windrows; a radar sensor mounted to the machine, the radar sensor arranged to transmit first signals to, and receive first reflected signals from, one of the windrows and the field adjacent the one of the windrows; a lidar sensor mounted to the machine, the lidar sensor arranged to transmit second signals to, and receive second reflected signals from, the one of the windrows and the field adjacent the one of the windrows; and a processing circuit configured to receive data corresponding to the first and second reflected signals and determine a mass profile and a geometric profile of the one of the windrows based on the data.

DETAILED DESCRIPTION

Certain embodiments of a swath profile system and method (collectively also referred to herein as a swath profile system) are disclosed that fuse or combine information (e.g., data) from two types of sensors to determine the profile of a swath or windrow as a machine (e.g., agricultural machine) traverses a field. The machine is configured to collect a swath or windrow (hereinafter, windrow is used with the understanding that the terms swath and windrow are interchangeable) from the field. The term windrow refers generally to a row of cut or mown hay, grass, or crop materials. The windrow is typically left in the field to dry before it is collected, though not limited to these applications. The machine may include a baler, a tractor towing a baler, or a combine harvester. As described previously, different machines may use different drive paths to collect the windrow to optimize downstream processing (e.g., forming into a bale, prevent clogging in the feeder house, etc.) of the windrow. Implicit in the choice of drive path is that the orientation of the approach is based on a center of mass equal to the observable center of the windrow. However, the optically visible center of a windrow may not represent the center of mass of the windrow correctly. For instance, while drying out, the windrows may have been spread by the wind, pushing only the lighter portion of material downwind and to the sides, or the windrows may not have been perfectly formed by rakes in the first place. To address these challenges, certain embodiments of swath profile system comprise one or more processing circuits, a light detection and ranging (lidar) sensor, and a radio detection and ranging (radar) sensor. Data corresponding to signals reflected from the windrow and surrounding surfaces of the windrow (e.g., adjacent field) based on transmission of signals by both sensors are received by the processing circuit(s) and used to develop a swath profile. The swath profile comprises a mass profile of the windrow and a geometric profile (e.g., envelope) of the windrow. A steering system of the machine may use a guidance curvature command derived from the swath profile to autonomously guide the machine along a collection path in a manner that ensures efficient collection and processing of the windrow.

Having summarized certain features of a swath profile system of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, the focus is on collection of windrows from a machine embodied as a combine harvester. However, certain embodiments of a swath profile system may be deployed in other machines or a combination of machines (e.g., towed and towing machines), including a baler (e.g., self-propelled or as towed) or a towing machine (e.g., a tractor) that tows the baler. Also, though described in the context of two electromagnetic (EM) spectrum sensors (e.g., the radar sensor and the lidar sensor), in some embodiments, additional EM sensors of the same type and/or of different types (e.g., image capture sensors) may be used. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents consistent with the disclosure as defined by the appended claims. Further, it should be appreciated in the context of the present disclosure that the claims are not necessarily limited to the particular embodiments set out in the description.

Figure 1B:
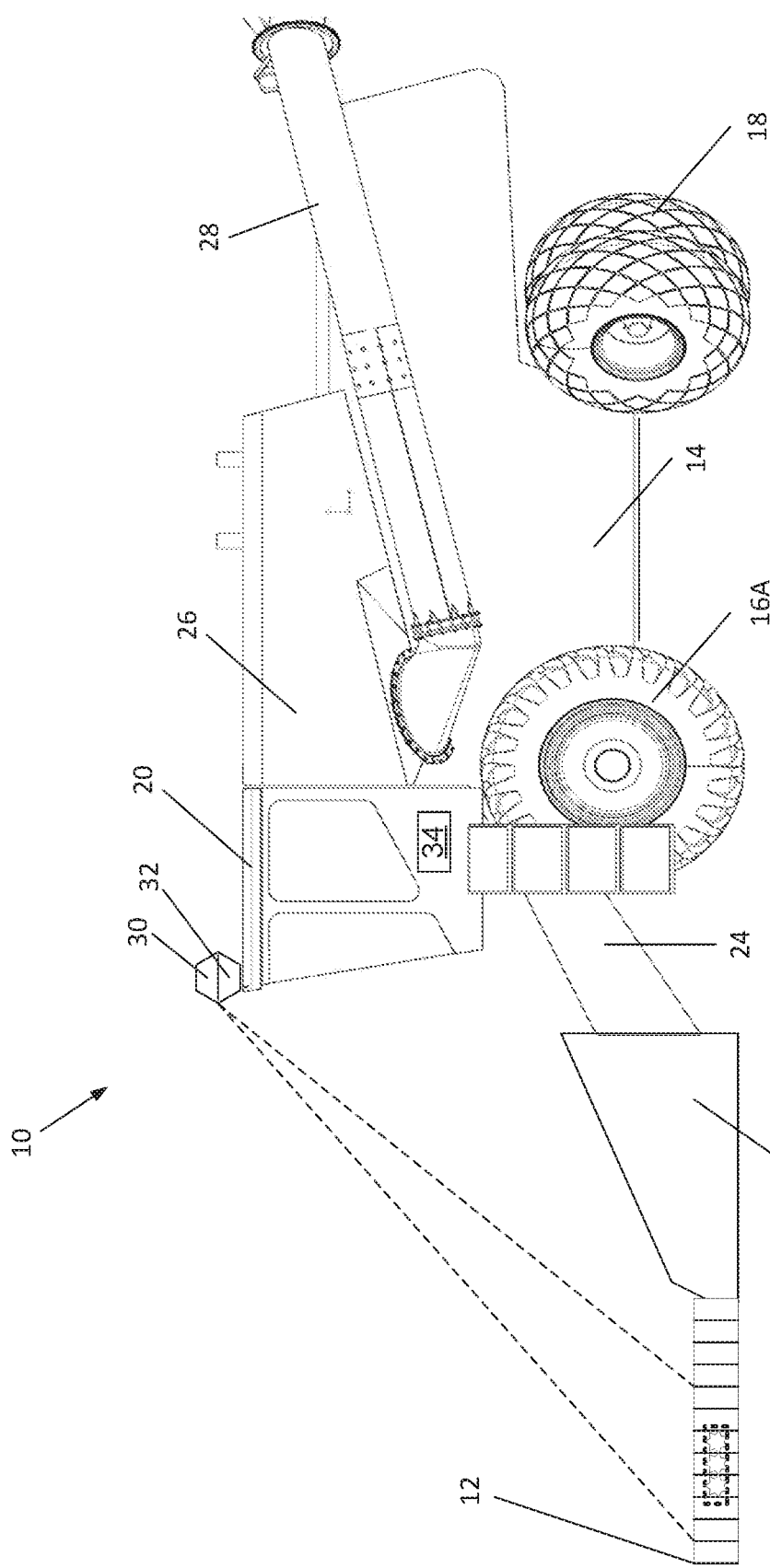
FIG. 1B is a schematic diagram that illustrates, in side elevation view, an example agricultural machine in which an embodiment of a swath profile system may be implemented.

Referring now to FIGS. 1A-1B, shown is an example agricultural machine embodied as a combine harvester 10 in which all or at least a portion of certain embodiments of swath profile systems and methods may be deployed. One having ordinary skill in the art should appreciate in the context of the present disclosure that the combine harvester design and operation shown in, and described in association with, FIGS. 1A-1B is merely illustrative, and that other designs and/or variations in operation are contemplated to be within the scope of the disclosure. Further, although the machine is depicted as a combine harvester 10, as indicated previously, the combine harvester 10 may be replaced with another machine or machines of other configurations, including a tractor or a baler or machines from other industries (e.g., forestry, municipal, etc.) that rely on surface envelopes or profiles and underlying structures or mass for navigation. The combine harvester 10 is shown in FIGS. 1A-1B as a self-propelled machine, and is operable to collect and process a windrow or swath 12 from a field. The combine harvester 10 includes a chassis or frame 14 supported by a pair of front drive wheels 16 (e.g., 16A, 16B) and a pair of rear wheels 18. In some embodiments, the front drive wheels 16 may be configured as tandem wheels disposed on each side of the chassis 14, and in some embodiments, the front and/or rear wheels 16, 18 may be replaced with tracks. The frame 14 supports a cab 20, within which an operator may control operation of the combine harvester 10.

The combine harvester 10 includes a harvesting header 22 at the front of the combine harvester 10 that delivers collected crop materials to the front end of a feeder house 24. As is known, such materials are moved upwardly and rearwardly within the feeder house 24 by a conveyor until reaching a beater that rotates about a transverse axis. The beater feeds the material upwardly and rearwardly to a rotary processing device, in this instance to a rotor having an infeed auger on the front end thereof. The auger, in turn, advances the materials axially into the processing system for threshing and separating operations. In other types of systems, the conveyor may deliver the crop material directly to a threshing cylinder. Generally speaking, the crop materials entering the processing system move axially and helically therethrough during threshing and separating operations. During such travel the crop materials are threshed and separated by the rotor operating in cooperation with foraminous, arcuate processing members in the form of threshing concave assemblies and separator grate assemblies. Bulkier stalk and leaf materials are retained by the concave assemblies and the grate assemblies and are impelled out the rear of the processing system and ultimately out of the rear of the combine harvester 10. Crop material expelled from the rotor and through the respective concave and separator grate assemblies (e.g., escaping laterally) flow to a cleaning system, where partially threshed crop material is separated and recirculated back through the processing and cleaning systems and the cleaned grain is routed to a storage bin 26 on top of the combine harvester 10, from which it is ultimately unloaded via an unloading spout 28 (shown in the stowed position). In some embodiments, the material discharged from the rear of the combine harvester 10 may be expelled directly to a baler for baling operations. As operations of a combine harvester 10 are known, further discussion of the same is omitted here for brevity.

The combine harvester 10 further comprises a radar sensor 30 and a lidar sensor 32. The radar and lidar sensors 30, 32 are mounted to the combine harvester 10. In one embodiment, the radar and lidar sensors 30, 32 are co-located. In one embodiment, the radar and lidar sensors 30, 32 are mounted to the top of the cab 20, and located centrally and forwardly on the cab 20 as depicted in FIGS. 1A and 1B to enable a suitable point of view of the windrow 12 and adjacent field surfaces. In some embodiments, the radar and lidar sensors 30, 32 may be located elsewhere on the combine harvester 10 as long as a suitable point of view of the windrow 12 is permitted. In FIGS. 1A-1B, the dashed lines extending between the lidar sensor 32 and the surfaces of the windrow 12 and surrounding surfaces of the field (which may include crop material, including grasses) schematically represent the EM raster signals of the lidar sensor 32, whereas the dashed-rectangular box with star-shaped objects schematically represent planes of distances or clusters from the EM signals of the radar sensor 30. The combine harvester 10 also comprises one or more processing circuits, including processing circuit 34. The processing circuit 34 comprises hardware and/or software to receive and process data from the radar and lidar sensors 30, 32. The data is based on the transmitted signals of the radar and lidar sensors 30, 32 and the corresponding reflection signals received from the windrow 12 and surrounding surfaces by the radar and lidar sensors 30, 32. The processing circuit 34 is also configured to compute a guidance curvature command based on the data corresponding to the reflected signals, and communicate the command to a steering system (e.g., steering circuit and corresponding software) of the combine harvester 10, as explained further below.

The field of view of the lidar sensor 32 is directed in a direction (e.g., forward direction) of the combine harvester 10. The lidar sensor 32 gathers distance measurements of solid surfaces, including objects and field surfaces, and communicates this data to the processing circuit 34. The lidar sensor 32 provides point clouds representing precise vectors from the viewpoint of the sensor to objects in its field of view. The radar sensor 30 has a field of view in the same direction as the field of view of the lidar sensor 32. The radar sensor 30 also gathers distance measurements, but instead of providing a point cloud of reflective points in the sensor direction, the radar sensor 30 provides 3-dimensional information describing pseudo planes or clusters (a dimensional area of a few centimeters depending on the resolution) including their relative directions towards the field of the view of the radar sensor 30. The pseudo planes may not be a representation of the exact position of a solid surface, but instead, may represent the location of the most significant reflections of the radar beams according to different levels of material penetration of the radar beams. The material properties influence the radar measurements. The radar beams penetrate material differently before being reflected or may not be reflected at all. The quality of information about material properties may be significantly increased by evaluating higher order reflections of the radar beams. The data gathered from the radar sensor 30, the data comprising implicit material property information, enables the processing circuit 34 to distinguish objects of different penetrativeness and therefore the dimensional and locational approximation of hidden objects and/or surfaces. Combining the vectors corresponding to data of the lidar sensor 32 with the surface data gathered with the radar sensor 30 enables a relatively precise, 3-dimensional representation of the windrow 12. The data is communicated to the processing circuit 34. The processing circuit 34 uses the precise distance measurements towards the solid reflective surfaces from the lidar sensor view direction to augment the radar data for a precise 3-dimensional representation of the windrow 12. It is noted that data from the sensors 30 and 32 also enable a speed calculation for the combine harvester 10.

Explaining further, using the lidar sensor 32 to measure distance towards the ground from the sensor point of view provides a surface line of the ground surface in the field of view direction. This surface line or geometric profile—if extended to more scan lines than a surface plane—includes the windrow and any other objects that at least partly reflect the lidar laser beams. In one embodiment, the radar sensor 30 scans from the same point of view as the lidar sensor 32 and in the same direction as the lidar scan yet delivers a different result. In some embodiments, the point of views of the radar and lidar sensors 30, 32 may be offset and corrected algorithmically. The radar beam penetration of the windrow 12 towards the underlying soil increases when moving away from the center of mass of the windrow 12, as graphically illustrated in FIG. 1A (e.g., as depicted in FIG. 1A, the clusters in the center of mass are higher in the windrow 12 based on the penetration of lesser depth compared to the clusters that are positioned away from the center of mass). In this example, the windrow 12 has a center of mass (CM) portion and a low density (LD) portion, the latter showing the clusters at a lower depth within the windrow 12 than the clusters of the center of mass portion (due to the differences in penetration depth). Over time, the windrow 12 may compress in certain areas and, particularly as drying of the windrow 12 progresses, portions of the windrow 12 may be wind-swept downward and to the sides. The entire outer envelope of the windrow 12 is detected via reflections from the lidar signals as the example rectangular profile shown in FIG. 1A, providing preciseness in measurement and a reference in conjunction with the radar information. Due to the penetration of the radar signals, the mass profile is determined, which may resemble the more irregular shaped area or volume under the dashed line and labeled CM in FIG. 1A. Thus, the combination of the mass profile and geometric profile provides a truer reference for the steering system of the combine harvester 10 to follow. For instance, and using a single dimensional direction for purposes of illustration, the radar reflections may indicate a distance from the combine harvester 10 to the windrow 12 of 12 meters away. However, the lidar reflections may indicate that the windrow 12 is 9.85 meters away, which indicates that the windrow 12 has a geometric profile that is closer to the combine harvester 10 than the underlying mass profile of the windrow 12. Sampling these values along the lidar scans and radar planes of the windrow 12 enables the processing circuit 34 to develop a swath profile comprising the mass profile and geometric profile. Having a more accurate picture of the swath profile enables the combine harvester 10 to collect the windrow 12 at a coordinate approach that improves efficiency for downstream processing of the windrow 12 (e.g., enabling a more evenly distributed collection for more efficient downstream processing). It is noted also that the center of mass of the windrow 12 still delivers a certain amount of reflections from the underlying soil as long as the windrow material is sufficiently dry. In some applications, these reflections from the underlying soil are considered unwanted noise, yet certain embodiments of a swath profile system uses such reflections as a representation of the soil surface below the windrow 12 as an integral part of measuring the dimensional and mass profile of the windrow 12.

Also noteworthy is that the combination of the radar and lidar sensors 30, 32 is used to obtain the swath profile, as each sensor 30, 32 may have, in certain circumstances, limitations standing alone. For instance, the lidar sensor 32 may be limited regarding the number of areas where reflections are measured (in addition to having inferior capabilities when compared to radar in various environmental or weather-related conditions, such as IR-based lidar in dusty or rain conditions or fog), resulting in fewer data samples but with relatively precise range measurements. The radar sensor 30 looks farther ahead, covers a larger area, and provides data with a higher update rate, which results in more data, but the data set may have more noise, and individual measurements may not be so precise. For instance, the use of the lidar sensor 32 offers improved measurements of angles and elevations when compared to the measurement of such parameters using the radar sensor 30. Combining these different measurement principles has certain advantages over use of each sensor alone, including improved robustness in different environments/weather conditions and/or improved the overall resolution and accuracy of determining the swath profile.

Figure 2A:
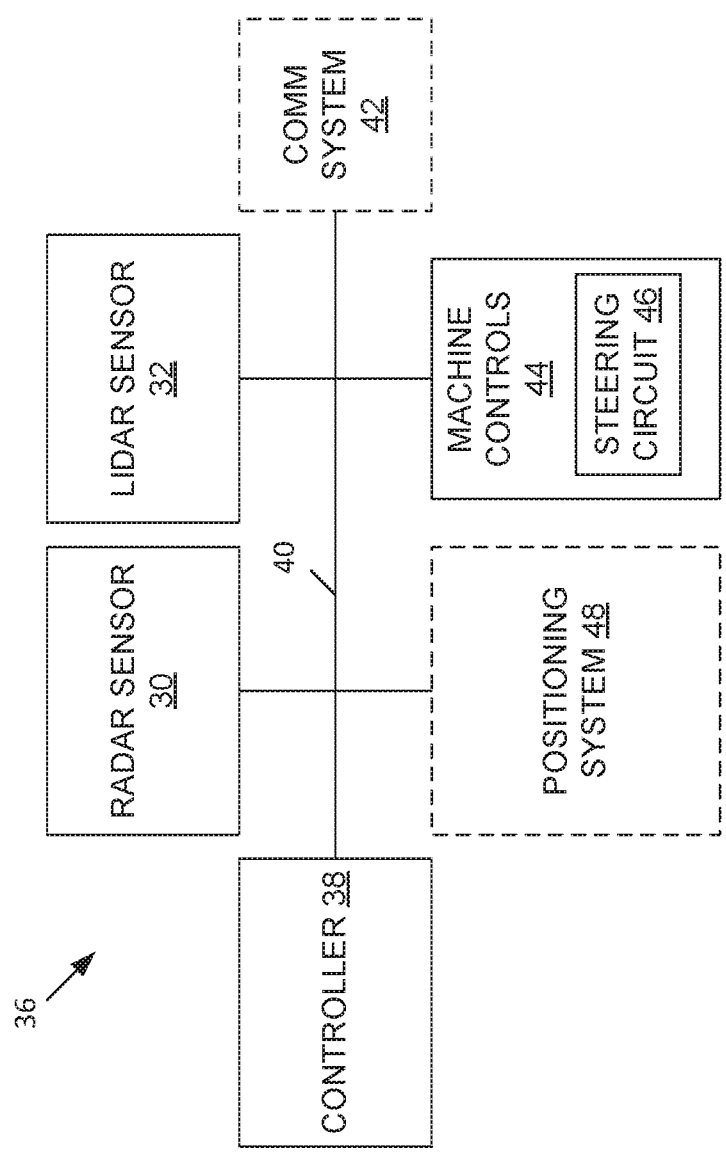
FIG. 2A is a block diagram that illustrates an embodiment of an example control system used for an embodiment of a swath profile system.

Having generally described an example application of the swath profile system, attention is directed to FIG. 2A, which illustrates an embodiment of an example control system 36 of a swath profile system. It should be appreciated within the context of the present disclosure that some embodiments may include additional control features or fewer or different control features, and that the example depicted in FIG. 2A is merely illustrative of one embodiment among others. The control system 36 comprises a controller 38 coupled in a CAN network 40 (though not limited to a CAN network or a single network) to the radar sensor 30, the lidar sensor 32, an optional (as noted by the dashed box) communication (COMM) system 42, machine controls 44, which may include steering circuit 46, and a positioning system 48 (e.g., global navigation satellite systems (GNSS) receiver, including a global positioning system or GPS, geographic information system (GIS), etc.). In one embodiment, the controller 38 comprises the processing circuit 34 (FIG. 1A), and is explained further below.

As is known, the radar sensor 30 transmits radio frequency (RF) electromagnetic (EM) waves (e.g., continuous or pulsed) towards a region of interest and receives and detects these EM waves when reflected from objects in that region. Primary components of the radar sensor 30 include an antenna, a transmitter, receiver, and signal processor (though in some embodiments, processing may be performed by the controller 38). The antenna may be monostatic or bistatic, and in one embodiment, comprises an electronically scanned (phased array) antenna, though some embodiments may use a mechanically scanned antenna. Operation is generally in the range of 3 MHz to 300 GHz, though most applications involve the range of 300 MHz to 35 GHz. In one embodiment, the radar sensor 30 comprises an opening angle of approximately seventy (70) degrees, though other angled openings may be used in some embodiments.

The lidar sensor 32, as is known, illuminates a targeted object with a laser light that may operate according to ultraviolet, visible, or near infrared light spectrums. The lidar sensor 32 is principally comprised of a laser, a scanner and optics to enable azimuth and elevation scans, a photodetector, a receiver, and a signal processor (though in some embodiments, signal processing may be performed by the controller 38). The lidar 32 generates a set of 3D data points (a point cloud) according to a coordinate system (e.g., x, y, z coordinates, though some embodiments may use a different coordinate system). The point cloud provides an envelope (e.g., geometric profile) of the windrow 12 (FIG. 1A). In one embodiment, the lidar sensor 32 has an opening angle of seventy (70) degrees, though angles of other dimensions may be used (e.g., 27 degrees). In some embodiments, multiple lidar sensors may be used of a smaller angle opening to meet a total opening of 70 degrees.

Collectively, the outputs of the radar sensor 30 and lidar sensor 32 are provided over the network 40 to the controller 38 in the form of a coordinate system based on incident angle and distance values relative to the sensors 30, 32. The mounting angle of the sensors 30, 32 on the combine harvester 10 and the pitch of the combine harvester 10 influence how these values translate into a plane coordinate system in front of the combine harvester 10. In other words, the input to the controller 38 is not in terms of absolute plane coordinates directly but rather are estimates from the relative distances, sizes and lateral positions of features detected in front of the combine harvester 10 based on a known sensor mounting angle and a limited margin of error for machine pitch variations.

The positioning system 48 enables the detection of a geofence or mapped areas, as well the detection of vehicle positioning, speed, and/or location of the combine harvester 10. In some circumstances, performance of the positioning system 48 may fall below a predetermined level or threshold of acceptable accuracy, or the satellite signal may fall below a predetermined signal level strength or quality. The degradation in performance may be signaled to the controller 38 by the positioning system 48 in some embodiments, or detected by the controller 38 in some embodiments. Note that in some embodiments, the positioning system 48 may be omitted, as represented by the dashed box labeled, "positioning system 48" in FIG. 2A.

The communication system 42 comprises a radio modem and/or cellular modem to enable the combine harvester 10 to transmit data to, and receive data from, one or more devices located external to the combine harvester 10 (FIG. 1A). For instance, communication system 42 may transmit data (e.g., data corresponding to the reflections of the radar and lidar sensors 30, 32) to a remote server, the remote server comprising functionality of the controller 38. The remote server may be used to remotely control (e.g., providing guided curvature commands) the combine harvester 10 based on the data. In some embodiments, the communication system 42 may access, from remote storage, topology maps (e.g., to predict pitch), among other maps or data (e.g., weather data, which may be used to weight the reliability of the radar and/or lidar sensor data) that may be useful to the guidance of the combine harvester 10 across the field and/or the accuracy of the swath profile system.

The machine controls 44 collectively represent the various actuators, sensors, and/or controlled devices residing on the combine harvester 10 to enable navigational or operational functionality. The machine controls 44 may include functionality used to control machine navigation, header functionality, combine processing, etc. The machine controls 44 further includes a steering circuit 46, which includes the pumps (e.g., hydraulic pumps), motors, control valves, etc. for enabling the guided (automatic) or manual steering of the combine harvester 10 (FIG. 1A). For guided steering, the control software may be implemented in the controller 38, or remotely in some embodiments.

Note that in some embodiments, one or more additional components may be coupled to the network 40, including a user interface (e.g., display device, FNR control or joystick, etc.).

Figure 2B:
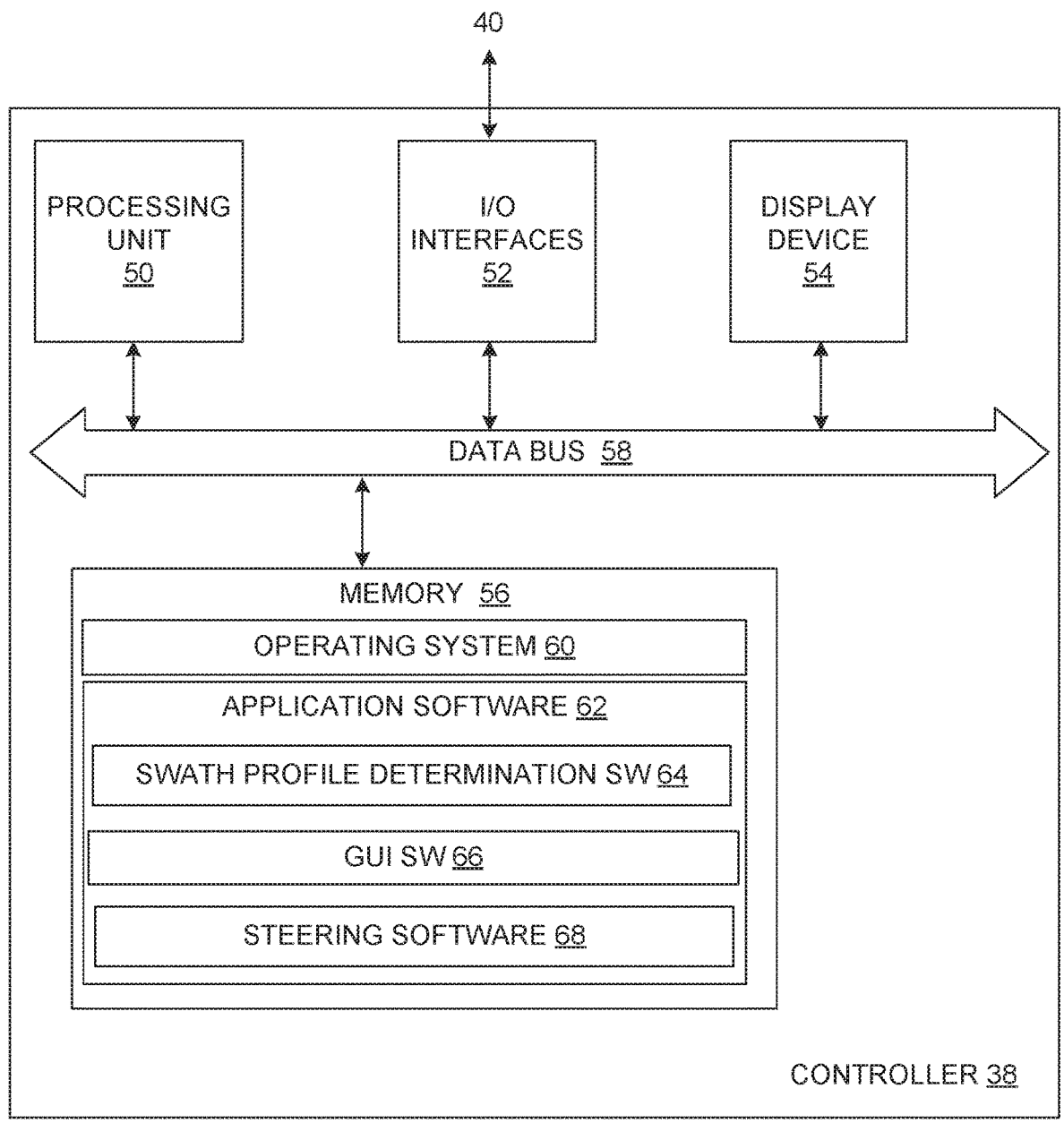
FIG. 2B is a block diagram that illustrates an embodiment of an example controller used in the control system of FIG. 2A.

FIG. 2B further illustrates an example embodiment of the controller 38. One having ordinary skill in the art should appreciate in the context of the present disclosure that the example controller 38 is merely illustrative, and that some embodiments may comprise fewer or additional components, and/or some of the functionality associated with the various components depicted in FIG. 2B may be combined, or further distributed among additional modules or devices, in some embodiments. As indicated previously, in one embodiment, the controller 38 may comprise the processing circuit 34 (FIG. 1A) explained previously. In some embodiments, the processing circuit 34 may comprise components that include the controller 38 and additional components, including one or more of the components of the control system 36 (FIG. 2A). In some embodiments, the processing circuit 34 may comprise a subset of the components of the controller 38. The controller 38 is depicted in this example as a computer system. It should be appreciated that certain well-known components of computer systems are omitted here to avoid obfuscating relevant features of the controller 38. In one embodiment, the controller 38 comprises one or more processing units, including processing unit 50, input/output (I/O) interface(s) 52, display device 54, and memory 56, all coupled to one or more data busses, such as data bus 58. The memory 56 may include any one or a combination of volatile memory elements (e.g., random-access memory RAM, such as DRAM, and SRAM, etc.) and nonvolatile memory elements (e.g., ROM, hard drive, tape, CDROM, etc.). The memory 56 may store a native operating system, one or more native applications, emulation systems, or emulated applications for any of a variety of operating systems and/or emulated hardware platforms, emulated operating systems, etc. In the embodiment depicted in FIG. 2B, the memory 56 comprises an operating system 60, and application software 62. The application software 62 comprises, in one embodiment, swath profile determination software 64, graphical user interface (GUI) software 66, and steering software 68. In some embodiments, functionality of one or more of these software modules may be combined into a single software module, or further distributed according to additional modules in memory 56 or other memory. In some embodiments, functionality for one or more of the software modules may be stored remotely. In some embodiments, a separate storage device (e.g., a non-transitory, computer readable storage medium) may be coupled to the data bus 58 (or the network 40, FIG. 2A), such as a persistent memory (e.g., optical, magnetic, and/or semiconductor memory and associated drives).

The swath profile determination software 64 receives data corresponding to the radar and lidar reflections from the field and windrow 12 (FIG. 1A), the data received from the radar and lidar sensors 30, 32. Based on the data, the swath profile determination software 64 determines the swath profile comprising the geometric profile and mass profile of the windrow 12, and also computes a guided curvature command for use by the steering software 68 based on the swath profile. As indicated previously, the swath profile comprises coordinates determined based on the reflections and the incident angles. In some embodiments, the steering software 68 receives the coordinates of the swath profile and computes the guided curvature command. The GUI software 66 provides feedback, alerts, and/or recommendations to an operator based on data received from the network 40 of FIG. 2A (e.g., via I/O interfaces 52) and/or from the software modules of the application software 62. For instance, the steering software 68 may detect (or receive an indication) that performance of the positioning system 48 (FIG. 2A) may not meet certain predetermined criteria (e.g., poor accuracy, insufficient satellite signal strength or quality, etc.). The steering software 68 may communicate this condition/information and provide an alert and/or recommendation to the GUI software 66. The alert may be embodied as a warning that the positioning system 48 is operating below recommended performance levels, and the recommendation may be to switch to steering that is guided by the data from the radar and lidar sensors 30, 32. The GUI software 66 may enable the operator to select on a screen an option to make the switch in manner of guided steering, or may direct the operator to select a button or switch on a console in the cab 20 (e.g., FIG. 1A) to enable the switch to radar and lidar based guided steering. In some embodiments, the detection or determination of inadequate positioning system performance may trigger the (automatic—without operator intervention) deactivation by the steering software 68 of steering that is guided by the positioning system 48 and automatic activation of radar and lidar-based guided steering, and in some embodiments, the GUI software 66 may present an acknowledgement button icon and/or a button icon that provides an operator the opportunity to reject or cancel the switch (or impending switch) to radar and lidar based steering. These and/or other mechanisms for handling a switch to radar and lidar based steering from satellite guided steering may be used, and hence are contemplated to be within the scope of the disclosure. The steering software 68 receives, or in some embodiments computes based on the swath profile, a guided curvature command, and communicates the command to the steering circuit 46 for adjustment of direction and/or movement of the combine harvester 10 relative to the swath profile determinations.

Execution of the software modules 62-68 is implemented by the processing unit 50 under the management of the operating system 60. In some embodiments, the operating system 60 may be omitted and a more rudimentary manner of control implemented. The processing unit 50 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 38.

The I/O interfaces 52 provide one or more interfaces to the network 40 (FIG. 2A), as well as interfaces for access to one or more computer readable mediums, such as memory drives, which includes an optical, magnetic, or semiconductor-based drive. In other words, the I/O interfaces 52 may comprise any number of interfaces for the input and output of signals (e.g., analog or digital data) for conveyance over the network 40. The input may comprise input by an operator (local or remote) through a keyboard or mouse or other input device (or audible input in some embodiments), and input from signals carrying information from one or more of the components of the control system 36 (FIG. 2A).

The display device 54 comprises one of a variety of types of displays, including liquid crystal diode (LCD), plasma, among others, that provide an outputted GUI to the operator as indicated above. Note that in some embodiments, the display device 54 may be a headset-type display with or without an audio component. In some embodiments, the display device 54 may be accessed by the processing unit 50 via the network 40.

When certain embodiments of the controller 38 are implemented at least in part as software (including firmware), as depicted in FIG. 2B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 38 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 3:
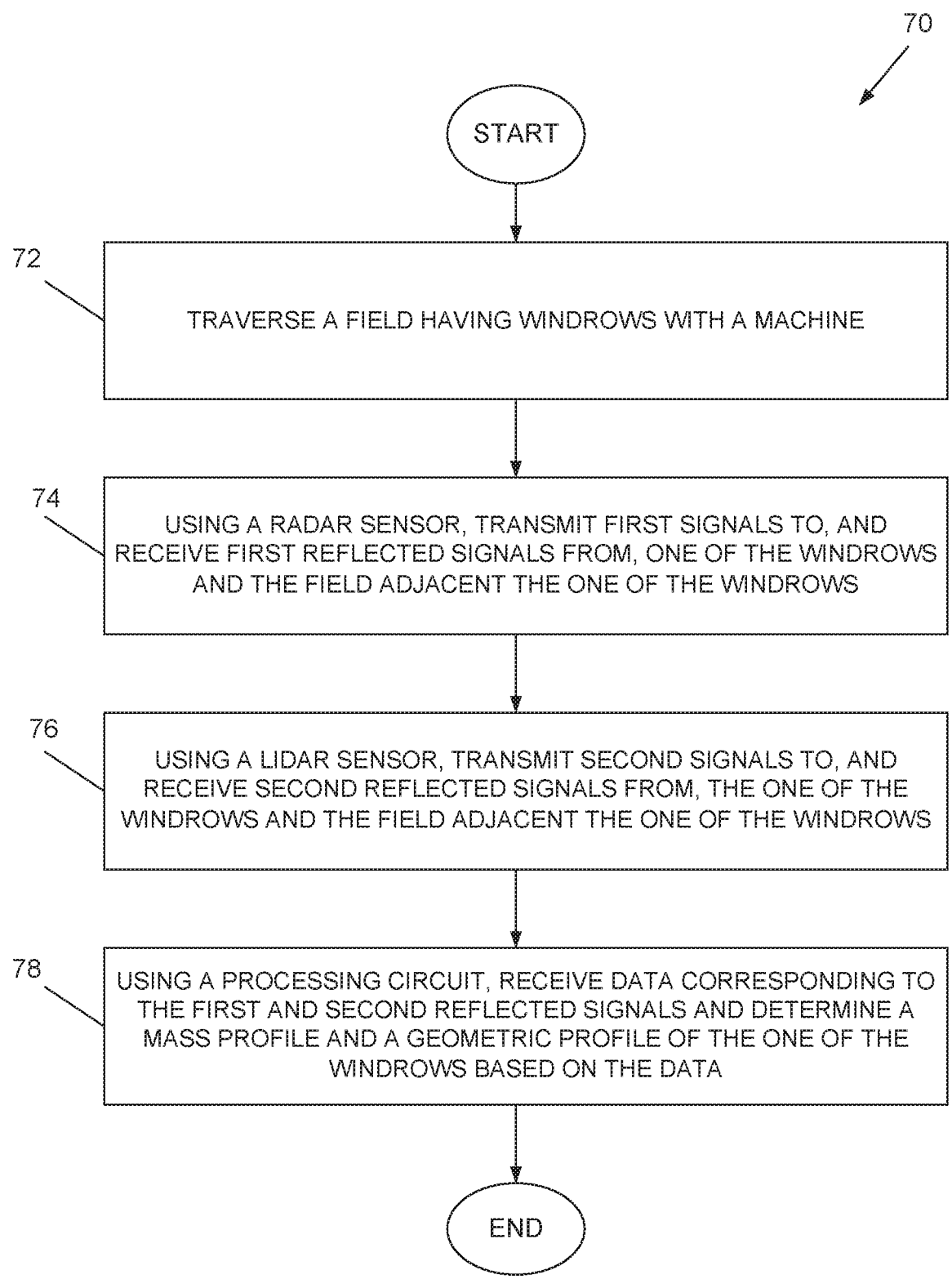
FIG. 3 is a flow diagram that illustrates an embodiment of an example swath profile method.

Having described certain embodiments of a swath profile system, it should be appreciated within the context of the present disclosure that one embodiment of a swath profile method, denoted as method 70 as illustrated in FIG. 3, comprises traversing a field having windrows with a machine (72); using a radar sensor, transmitting first signals to, and receiving first reflected signals from, one of the windrows and the field adjacent the one of the windrows (74); using a lidar sensor, transmitting second signals to, and receiving second reflected signals from, the one of the windrows and the field adjacent the one of the windrows (76); and using a processing circuit, receiving data corresponding to the first and second reflected signals and determining a mass profile and a geometric profile of the one of the windrows based on the data (78).

One or more of the process descriptions or blocks in the flow diagram of FIG. 3 should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present invention, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:
1. A system, comprising:
a machine configured to traverse a field having windrows;
a radar sensor mounted to the machine, the radar sensor arranged to transmit first signals to, and receive first reflected signals from, one of the windrows and the field adjacent the one of the windrows;

a lidar sensor mounted to the machine, the lidar sensor arranged to transmit second signals to, and receive second reflected signals from, the one of the windrows and the field adjacent the one of the windrows; and a processing circuit configured to receive data corresponding to the first and second reflected signals and determine a mass profile and a geometric profile of the one of the windrows based on the data.

2. The system of claim 1, wherein the processing circuit is further configured to determine the mass profile by determining a center of mass of the one of the windrows based on data corresponding to a difference in reflective distances between the first reflected signals and the second reflected signals.

3. The system of claim 1, wherein the processing circuit is further configured to determine the geometric profile based on data corresponding to a point cloud that is based on the second reflected signals.

4. The system of claim 3, wherein the processing circuit is further configured to determine the geometric profile based further on data corresponding to reflective distances from the field derived from the first reflected signals and the second reflected signals.

5. The system of claim 1, wherein the processing circuit is further configured to determine the mass profile and the geometric profile based on a predetermined incident angle.

6. The system of claim 1, wherein the lidar sensor and the radar sensor are co-located.

7. The system of claim 6, wherein the machine further comprises a cab, wherein the lidar sensor and the radar sensor are mounted to a top of the cab.

8. The system of claim 1, wherein the machine further comprises a steering system, wherein the processing circuit is further configured to communicate a guidance curvature command to the steering system based on the mass and geometric profiles.

9. The system of claim 8, wherein the steering command causes the steering system to adjust a movement of the machine relative to the one of the windrows without operator intervention.

10. The system of claim 8, wherein the processing circuit is further configured to, prior to the transmission of first and second signals:

determine that performance of a global navigation satellite system (GNSS) guided steering is below a first threshold level or that a GNSS signal is below a second threshold level or signal quality.

11. The system of claim 10, further comprising a user interface, wherein based on the determination that performance of the GNSS guided steering is below the first threshold level or that the GNSS signal is below the second threshold level or signal quality, the processing circuit is further configured to:

deactivate the GNSS guided steering;
activate lidar and radar guided steering; and
alert an operator via the user interface that lidar and radar guided steering is activated.

12. The system of claim 11, wherein prior to the deactivation, activation and the alert, the processing circuit is further configured to:

provide a notification via the user interface, the notification comprising a recommendation to use lidar and radar guided steering, the deactivation, activation and the alert based on operator input generated in response to the notification.

13. The system of claim 1, wherein the machine comprises a combine harvester.

14. The system of claim 1, wherein the machine comprises a tractor.

15. The system of claim 1, wherein the machine comprises a baler.

16. A method, comprising:

traversing a field having windrows with a machine;

using a radar sensor, transmitting first signals to, and receiving first reflected signals from, one of the windrows and the field adjacent the one of the windrows;

using a lidar sensor, transmitting second signals to, and receiving second reflected signals from, the one of the windrows and the field adjacent the one of the windrows; and using a processing circuit, receiving data corresponding to the first and second reflected signals and determining a mass profile and a geometric profile of the one of the windrows based on the data.

17. The method of claim 16, further comprising:

determining the mass profile by determining a center of mass of the one of the windrows based on data corresponding to a difference in reflective distances between the first reflected signals and the second reflected signals; and determining the geometric profile based on data corresponding to a point cloud based on the second reflected signals, wherein the geometric profile is based further on data corresponding to reflective distances from the field derived from the first reflected signals and the second reflected signals.

18. The method of claim 16, further comprising communicating a guidance curvature command to a steering system based on the mass and geometric profiles, wherein the guidance curvature command causes the steering system to adjust a movement of the machine relative to the one of the windrows without operator intervention.

19. The method of claim 18, further comprising prior to the transmission of first and second signals:

determining that performance of a global navigation satellite system (GNSS) guided steering is below a first threshold level or that a GNSS signal is below a second threshold level or signal quality; and providing an operator an option to switch from GNSS guided steering to lidar and radar guided steering.

20. A non-transitory computer readable storage medium comprising instructions that, when executed by one or more processing circuits, causes the one or more processing circuits to:

receive data corresponding to first reflected radar signals;

receive data corresponding to second reflected lidar signals; and determine a mass profile and a geometric profile of a windrow based on the data corresponding to the first and second reflected signals.

* * * * *